United States Patent [19]
Fallah

[11] Patent Number: 5,821,877
[45] Date of Patent: Oct. 13, 1998

[54] SYSTEM OF COMMUNICATIONS BETWEEN A POST AND MOVING BODIES

[75] Inventor: Michel Fallah, Aubagne, France

[73] Assignee: Gemplus Card International, Gemenos, France

[21] Appl. No.: 822,207

[22] Filed: Jan. 17, 1992

[30] Foreign Application Priority Data

Jan. 18, 1991 [FR] France ................................. 91 00559

[51] Int. Cl.[6] .......................... H04B 14/00; G08G 1/017
[52] U.S. Cl. ........................................................ 340/825.54
[58] Field of Search ..................... 340/825.08, 825.34, 340/825.54, 825.52, 870.11, 870.13, 988, 933, 928; 371/52, 48; 455/41, 54.1, 57.1, 99; 235/384

[56] References Cited

U.S. PATENT DOCUMENTS

| | | | |
|---|---|---|---|
| 3,701,102 | 10/1972 | Berman et al. | 340/928 |
| 3,898,619 | 8/1975 | Caasten et al. | 340/825.54 |
| 4,477,799 | 10/1984 | Roffi et al. | 340/825.54 |
| 4,495,496 | 1/1985 | Miller, III | 340/825.54 |
| 4,551,710 | 11/1985 | Troupet et al. | 340/825.54 |
| 5,021,777 | 6/1991 | Gross et al. | 340/825.54 |
| 5,150,114 | 9/1992 | Johansson | 340/825.54 |

FOREIGN PATENT DOCUMENTS

| | | |
|---|---|---|
| 041193 | 12/1981 | European Pat. Off. . |
| 285419 | 10/1988 | European Pat. Off. . |
| 0401192 | 12/1990 | European Pat. Off. ............... 340/928 |
| 3026143 | 2/1982 | Germany . |
| 541845 | 6/1972 | Switzerland . |
| 2077555 | 12/1981 | United Kingdom .............. 340/825.54 |
| 2186409 | 8/1987 | United Kingdom . |

OTHER PUBLICATIONS

"Automatic Vehicle Identification" AMTECH, 1988.

*Primary Examiner*—Mark H. Rinehart
*Attorney, Agent, or Firm*—Oblon, Spivak, McClelland, Maier & Neustadt, P.C.

[57] ABSTRACT

Disclosed is a system of communication between a fixed post and moving bodies that may arrive simultaneously in the radius of action of this post. This system uses an exchange protocol that begins with an initializing signal (INIT) common to the different moving bodies that arrive and continues with the transmission of an identification signal by each moving body, this transmission being done at the end of a duration (T+Nt) related to the value (N) of a part of an intrinsic specific code associated with the moving body, this duration being measured from the initialization signal. Preferably, the moving body transmits the beginning of its specific code, for example the first character of this code, followed by a random word having stipulated characteristics such that the terminal can detect whether several moving bodies have transmitted the same first character simultaneously. The post then asks them to transmit a second character in order to distinguish them from one another. Personalized exchanges could then begin when all the moving bodies have been identified.

8 Claims, 2 Drawing Sheets

SYSTEM OF COMMUNICATIONS BETWEEN A POST AND MOVING BODIES

BACKGROUND OF THE INVENTION

The invention relates to the exchange of data between a fixed station and vehicles or moving bodies that arrive in the vicinity of this station.

The typical application that shall be referred to hereinafter to facilitate the explanation is that of a toll station on a highway where it is desired to set up means for vehicles to pay the required fee without being obliged to stop. This would prevent the loss of time caused by stopping and would prevent the traffic jams that result from the fact that collecting fees by and is a slow process. Hence, contact-free means of transmission/reception (electromagnetic means in the broad sense) will be used, and the problem then will be that of communications between the station and the different vehicles that arrive in its vicinity.

It is possible to envisage other applications in which the invention could be usefully applied. For example, its use could be envisaged in a system of payment for public transport, or in a company using a large number of vehicles where entries and exits would have to be recorded, or in a police checking system etc.

In general, the problem that the invention seeks to resolve is that of improving the possibility of personalized exchanges between a station and moving bodies, in a context where several moving bodies are liable to arrive simultaneously and where these moving bodies cannot be identified in advance. The term "personalized" refers to the fact that the communications between the station and each moving body is an individual communication, i.e., that messages can be sent to a single moving body if so desired, and not to all those present.

The station is considered to be "fixed" in relation to the "moving" bodies that come before it; however, its fixed nature is relative: the station could itself be mobile, for example in a police checking application.

In the example of toll fees on a highway, the fixed station could have a large number of vehicles moving past it, including possibly several at a time during the period when data is exchanged between the station and the vehicles. This exchange of data may consist of an identification of the vehicle (which sends an identification signal), a transaction (the payment of a fee), and a "transaction completed" message sent to the vehicle that has been identified beforehand.

It will be easy to understand the difficulties that this may cause if several vehicles make attempts simultaneously to communicate with the station.

SUMMARY OF THE INVENTION

To improve the possibilities of personalized data exchanges between a station or "post" and moving bodies liable to come into the vicinity of the post, the invention provides for a system using an exchange protocol that begins with an initializing signal common to the different moving bodies that arrive and continues with the transmission of an identification signal by each moving body, this transmission being done at the end of a duration related to the value of a character (or more generally a part) of an intrinsic specific code associated with the moving body (a duration measured from the initialization signal) in such a way that different instants of transmission correspond to different characters. To express this idea by a concrete example, a reference number may be associated with each moving body, and the character that defines the instant of transmission may be the first digit of the number. A moving body having the number 1 as its first digit will send or transmit at the end of a period $T$; a vehicle having 2 as its first digit will transmit at the end of $T+t$; the others at the end of $T+2t$, $T+3t$ etc., according to the first digit of their reference number.

As shall be seen further below, the moving body then preferably sends, as an identification signal, the specific character used to define the instant of transmission (for example the beginning of the intrinsic specific code); and preferably it then sends a word having stipulated characteristics recognizable by the post, such that the post can immediately detect whether several moving bodies are making simultaneous transmission (for it is possible for two moving bodies having the same specific character to arrive simultaneously in the vicinity of the post).

Consequently, according to one aspect of the invention, there is proposed a communications system comprising:

a transponder associated with each moving body liable to arrive in the vicinity of the post, a specific code with at least one character being associated with each transponder, the characters being chosen from an ordered set (digital or alphabetical or alphanumerical characters for example) in which ordered values are assigned to these characters or to groups of characters;

a control device located in the post and communicating by electromagnetic means with the transponders;

the system having the following particular features:

a transponder is capable of transmitting an identification signal only from the reception of an initialization signal transmitted by the post;

the transponder transmits at least the beginning of its specific code at the end of a period of time related unequivocally to the value of this beginning of the code, so that two transponders having a different beginning of a code transmit at different instants.

by this means, a result is obtained wherein the different specific codes do not reach the post simultaneously even if several moving bodies arrive at the same time in the field of action of the post.

The post may therefore record the different transmissions coming from the transponders and detect the presence of several transponders in its radius of action. A dialog is then set up between the post and each of the transponders: each transponder, interrogated by the post in being designated by the beginning of the code received by this post, may for example:

receive a personal code designed to be used during the period of the data exchange;

send out data relating to itself code of the transponder, registration vehicle bearing it, owner's cash account receive other data;

receive an end-of-exchange signal—etc.

The beginning of the code sent by a response to the initialization signal sent by the post may be constituted by the first character of a specific code with several characters. If, for example, it is a numerical decimal character (numeral between 0 and 9), there is nevertheless a non-negligible probability (depending on the number of vehicles that may arrive simultaneously in the field of action of the post) that two vehicles having the same first code character will arrive simultaneously and therefore make simultaneous transmission. In this case, confusion could arise in the post which would assume that it was undertaking dialogue with one transponder when there were two of them. The probability diminishes if an alphabetic or alphanumerical character is used, or if the first two characters of the code (or even a greater number of characters) are used as the beginning of a code.

However, it is difficult to envisage the use of more than two characters, and even then this can only be done on condition that these characters are chosen from an ordered sequence comprising few characters. Indeed, the interrogation sequence would stretch out excessively: assuming, for example, that each transponder transmits only at the end of a duration proportional to the rank of an alphabetical character among 26 possible characters, it must be seen to it that the interrogation sequence begins by 26 periods of waiting for reception of one of the 26 possible characters. And if the first two characters of the code are used to reduce the probability that two vehicles having the same beginning of a code arrive simultaneously in the vicinity of the post, the interrogation sequence would have to start with 26×26 waiting periods: this becomes prohibitive without even managing to reduce the probability of confusion to a sufficiently low value.

This is why an additional improvement is proposed herein: in response to the initialization signal sent out by the post, each transponder sends out a signal (in principle the beginning of its code) at the end of a period unequivocally related to the beginning of its specific code, followed by a word that is a sequence of bits. This sequence is not quite any sequence whatsoever but is of a recognizable type and is such that the superimposition of two sequences of this type gives a sequence of a different type. The sequence is preferably a sequence having partially random characteristics.

To clarify this abstract definition, a very simple example may be given; the random sequence is, for example, a sequence of n "logic zeros" and n "logic ones" mixed in a random order. There are always n zeros and n ones but their order is random. If two transponders simultaneously transmit sequences of this type, the post will receive a sequence of zeros and ones which will, so to speak, be a logic OR function or a logic AND function combining the two sequences transmitted in superimposition, and will certainly not include as many zeros as ones. The sequence received will be of a type different from the types of sequences transmitted. It will be very easy for the post to detect the fact that several transponders have simultaneously sent a random sequence, the characteristics of which are stipulated.

The term "random sequence" will naturally also include pseudo-random sequences, sequences resembling random sequences etc.

Although the transmission of a random sequence is the preferred approach of the invention, it is also possible to provide for an approach where the sequence is constituted by non-random binary words representing one or more characters (taken, for example, from an identification code of the transponder), but only on condition that the superimposition of transmissions by several transponders produces a sequence of characters, at the post, that cannot be the characters of individual transponders. For example, the characters of the transponders are binary encoded decimal digits with an encoding such that the superimposition of transmission of two or more digits, whatever they may be, gives a binary sequence that cannot be interpreted as a digit. It is then easy to know if a single transponder has sent a numeral or if, on the contrary, several transmitters have transmitted simultaneously. It is easy to find such codes: for example a digit from 0 to 9 may be encoded by ten successive bits which are all zero except only one of them, the position of the non-zero bit representing the digit. Any superimposition of different digits gives a code that does not represent one digit since it has several bits at one.

If there is thus a simultaneous transmission by several transponders owing to the fact that the beginning of the specific code of the two transponders is identical, the post then asks the transmitters to transmit the rest of this code; here again, this transmission is done at the end of a period related unequivocally to the value of this rest of the code. There is then a considerable decrease in the probability that the rest of the code is identical for two transponders which have already had identical beginnings. if, however, there were a risk of identity, then the previous procedure would be repeated, with the transmission of a (random or non-random) binary sequence enabling the detection of the simultaneous transmission by two or more transponders.

The word "transponder" is taken to mean a transmitter/receiver, but it is called a transponder (transmitter/responder) here because its main role is to transmit information elements above all in response to the commands of the post.

BRIEF DESCRIPTION OF THE DRAWINGS

Other features and advantages of the invention shall appear from the following detailed description, made with reference to the appended drawings, of which.

MORE DETAILED DESCRIPTION

Figure 1:
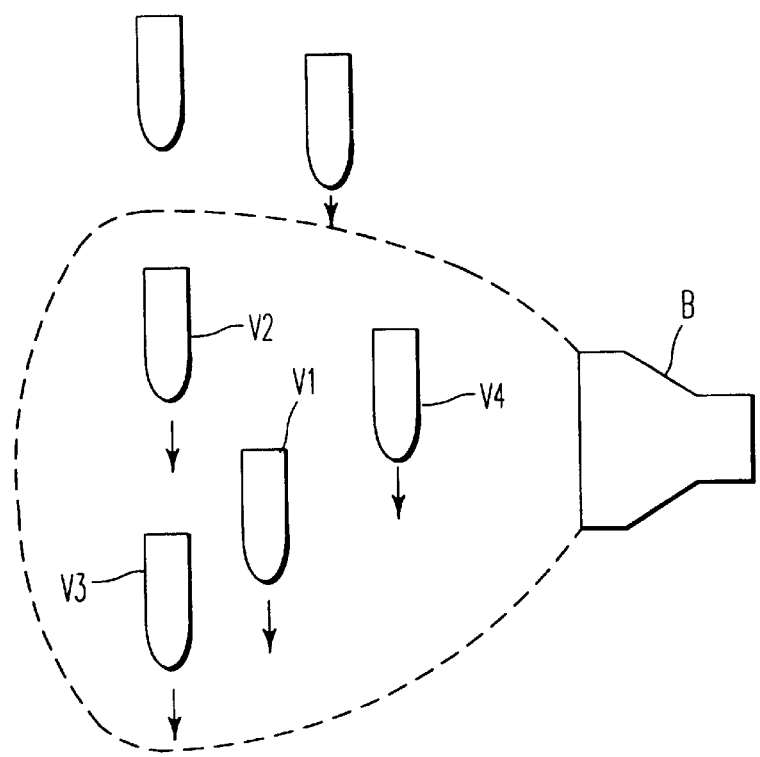
FIG. 1 shows a symbolic view of the post in the vicinity of which moving bodies arrive.
Figure 1:
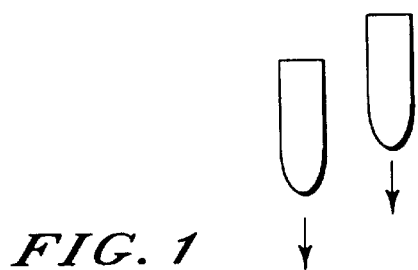
Figure 2:
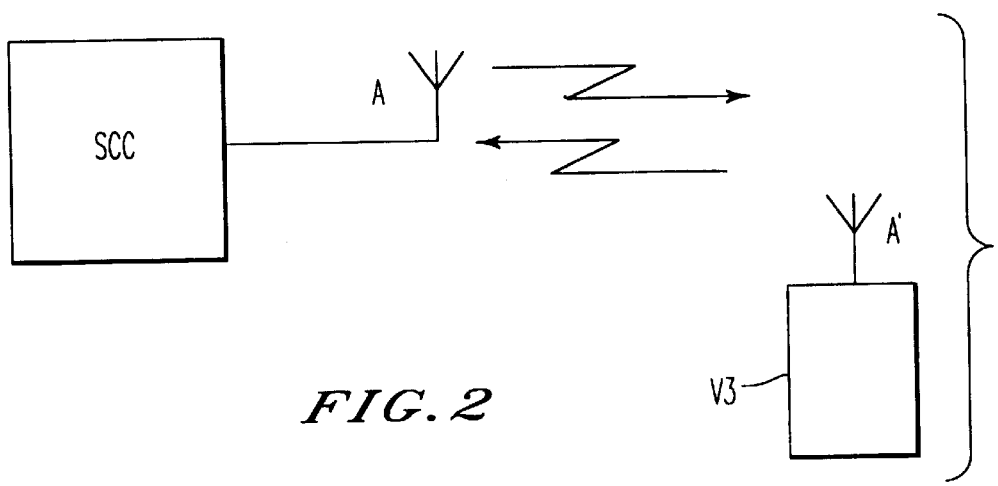
FIG. 2 shows a symbolic view of the system of communications between the post and a moving body.

The preferred embodiment described hereinafter is explained with reference to a highway toll type of application.

A tollgate post B is provided with electromagnetic communications means having a field of action that is limited in space, for example limited to a range of some tens of meters around it. Vehicles may pass through this field and engage in dialog with the post while passing through. This dialog should take place very speedily: for example, if the vehicles are travelling at 100 km/h, they will stay for one second in a 30-meter field. The figure shows four vehicles V1, V2, V3, V4 that are simultaneously present in the field of the post.

A transponder capable of communicating with the post is mounted on each vehicle.

The following assumptions are made:

the post transmits Information elements that can be picked up by all the transponders located in its radius of action;

the post is sensitive to all the signals coming from transponders located in its radius of action;

the post and all the transponders transmit on the same transmission channel (same carrier frequency);

the post should carry out all the transactions with all the transponders present within assigned time limits (which are short);

the post cannot (in principle) transmit and receive at the same time;

the transponders engage in dialog with the post but not with one another.

The post will act as master of the system, and will assume responsibility for assigning the identified transponders the time periods during which they may transmit. It consequently knows the history of the exchanges with each transponder from the moment when the link was sat up.

The transponders act as slaves and cannot transmit or act unless ordered to do so by the post.

An intrinsic specific code is associated with each transponder. This intrinsic specific code is formed by a combination of predefined characters chosen in an ordered sequence. For example, the sequence is a sequence of decimal digits, or of alphabetical characters or of alphanumerical characters.

To give a clearer picture, the intrinsic specific code of the transponder is the registration number of the vehicle, or again the maker's serial number of the transponder, or a chip card that is inserted into the transponder or possibly even directly a bank account number etc.

A transponder does not transmit simultaneously. It transmits only on the basis of an initialization signal which will be sent, in principle, periodically by the post.

When the transponder receives a signal such as this, it means that it is within the field of action of post. It then waits for a period of time proportional to the first character of its intrinsic specific code.

It then sends this first character (it could send another type of identification signal that is proper to it but, in this preferred example, it sends this first character). And it follows it up with a signal representing a word that has characteristics of a determined type but is, in principle, different from one vehicle to another and is such that the post can determine, without difficulty, whether a single word has been sent or if two different words have been sent simultaneously by two transponders.

In the preferred example described, this word is a random type or word, i.e. it is not predetermined in advance, so that is extremely improbable that two vehicles that are simultaneously present and that simultaneously transmit the same first character will also transmit the same random word.

To avoid difficulties in distinguishing when two transponders transmit simultaneously, the following procedure nay be applied; the random sequence is a sequence of n one bits and n zero bits, randomly ordered in tine. If two sequences are transmitted simultaneously, the post will receive a sequence that does not have the same number of ones and zeros, and it will be very easy to distinguish it from a sequence that is due to a single transmission by a single transponder and has the same number of ones and zeros.

If there is transmission by a single transponder, the dialog could be set up subsequently with this transponder in using, as an identification signal, the first character that it has transmitted.

But if there are two or more transponders that have transmitted the same first character simultaneously, an complementary interrogation stop will take place. It will consist in making the transponders transmit the second character of their specific code.

However, this step occurs only after the end of the waiting period necessary to wait for all the transponders that may be present to send their first characters.

To give a clear picture, it may be assumed, by way of an example, that the vehicles V1 to V4 have the following specific numerical codes:

VI: 1260
V2: 3542
V3: 5214
V4: 5379

And it is assumed that the waiting periods for transmitting a character of the code after the initialization signal are T+Nt, where N represents the character to be transmitted (between 0 and 9).

The following is the protocol:

Step 0: time 0; the post transmits the initialization signal INIT, which is received by all the transponders within the radius of action;

Step 1: time T to T+9t; the post is listening to transmissions coming from the transponders; here there are four of them which will transmit at the times T+t, T+3t, and T+5t respectively since their first characters are 1, 3 and 5 respectively. V3 and V4 both transmit at the time T+5t.

Step 1*a:* V1 sends its first character (1), followed by a random code with n bits of a recognizable type; the post recognizes the character and the fact that the random code conforms to the stipulated type.

Step 1*b:* no transponder transmits;

Step 1*c:* V2 transmits its first character (3) and a random code, which are recognized and verified by the post;

Step 1*d:* no transponder transmits;

Step 1*e:* V3 and V4 simultaneously send their character (b); the post receives it and recognizes it; they also each sand a random code, but the superimposition of these codes means that the post does not recognize it as conforming to the stipulated type; a conflict is detected and shall be managed subsequently;

Step 1*f:* the post remains in a state of waiting for other transponders for a duration that is sufficient given the rule adopted for the transmission of the first character of the code; here there is no other message received;

Step 2: the listening cycle is ended; the post will assign each identified transponder a provisional code, valid for the duration of the dialog and cancelled thereafter; this code will serve to personalize the dialog between the post and each transponder;

Step 2*a:* the post addresses the transponder having sent the character (1), i.e. that of the vehicle V1 and assigns it a provisional code C1; to address this transponder, the post will quite simply use the first character (1);

Step 2*b:* the post addresses the vehicle V2 (en sending the identification character 3) and assigns it a code C2;

Step 3: the post addresses all the vehicles having sent the character 5, and asks then to send the second character of their intrinsic specific code, and to transmit only at the end of a period of time related unequivocally to the value of this second character; to this end, a signal REINIT is transmitted to them to define the origin of the periods;

Step 4: the transponders of the vehicles V3 and V4 thus addressed transmit the second character of their specific code at the end of a period T+Nt if N is the value of the character (from 0 to 9);

Step 4*a:* no transponder responds

Step 4*b;* the vehicle V3 which has (2) for second character responds in sanding this character followed by a random word;

Step 4*c:* the vehicle V4 responds by mending the character (3) which is the second character of its code; then a random word.

Step 4*d:* the post waits until the end (T+9t) but no other transponder responds.

Step 5: having identified the two transponders that have transmitted in conditions or conflict, the post assigns each of them a provisional code for the duration of the transaction;

Step 5*a:* the post addresses the vehicle V3 in transmitting the sequence of characters 52 (or simply the second character 2) which represents the beginning of its specific code, and assigns it a provisional code C3;

Step 5b: the post addresses V4 in transmitting the sequence 53 (or simply 3) which represents the beginning of its intrinsic specific code and assigns it a provisional code C4.

Following steps: the dialog may be undertaken selectively with each transponder in using the provisional code assigned; this dialog may furthermore begin with each transponder in free time intervals as soon as this transponder has received a provisional code. It is the post that completely manages the assigning of the transmission times of each transponder. It will be understood that it is especially useful for the code character sent by each transponder to be the one used to compute the waiting period before transmission. In this way, the post may ascertain that there is truly a coincidence between the character received and the period at the end of which it is received. However, it is also possible to envisage the association, with the transponder, of two intrinsic specific codes: a first code, the characters of which are used to compute the instant at which the transponder must respond and a second code which is an identification code sent to the post at the end of the computed period.

Figure 3:
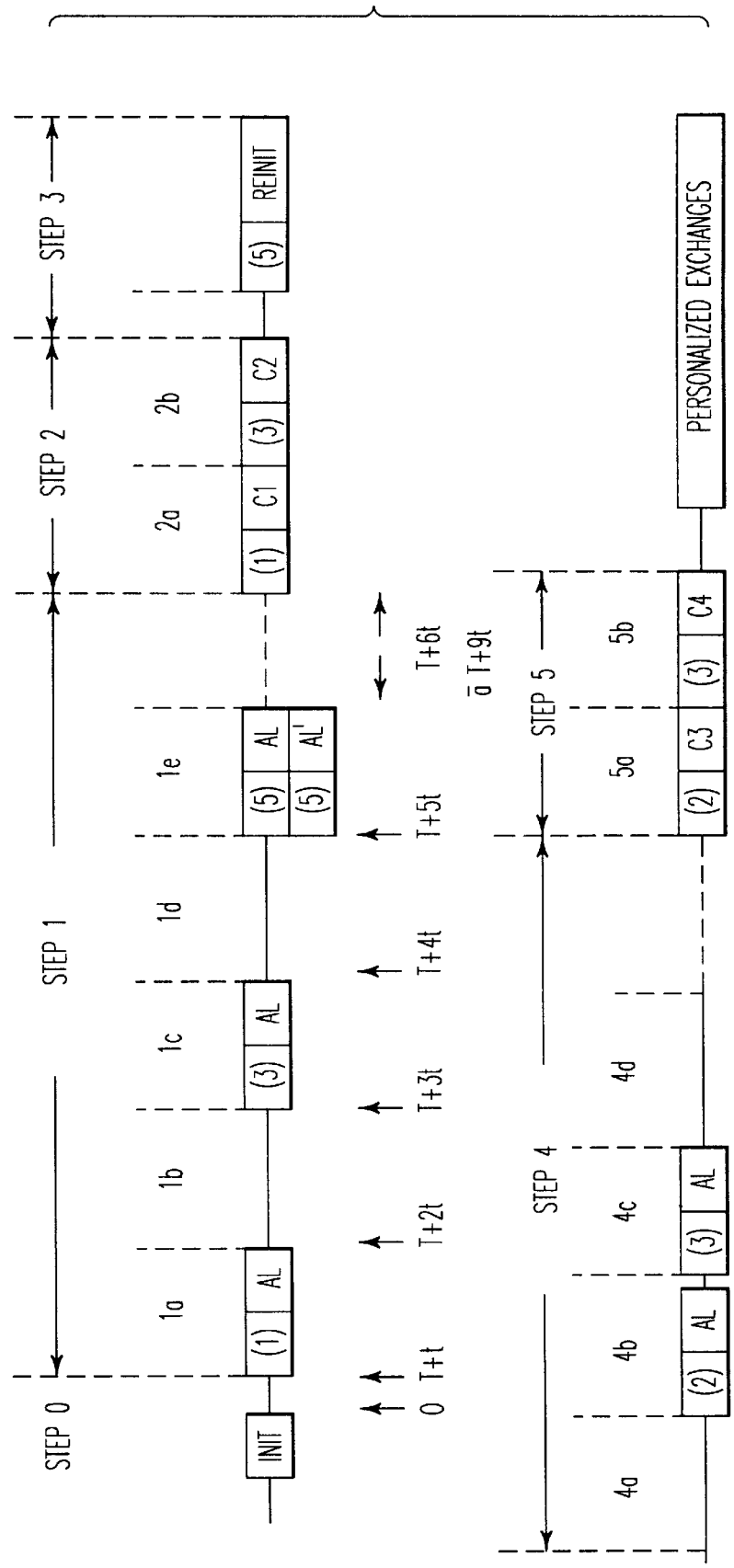
FIG. 3 illustrates the protocol of signals enabling the identification of moving bodies before a personalized exchange of data.

FIG. 3 recalls the timing diagram of the transmissions and receptions in accordance with what has been indicated here above. The exchange may take place with any moving body having received a code assigned by the post (for example, personalized exchanges with V(C1) and V(C2) after the step 2).

What is claimed is:

1. A system of personalized communication between a post and moving bodies which come into the vicinity of the post, wherein said system uses an exchange protocol that begins by means of a signal transmission initializer on said post which provides for a transmission of an initializing signal from said post, which said initializing signal is common to the different moving bodies that arrive in the vicinity of the post and said exchange protocol continues by means of an identification signal transmission means on each of said moving bodies which provides for the transmission of an identification signal by each moving body which is sent to said post, said transmission of an identification signal by one first moving body occurring at the end of a duration related to a duration value of an intrinsic code associated with said first moving body, said duration beginning in said moving body from the receipt of the initializing signal, said identification signal comprising a data corresponding to said duration value.

2. A system according to claim 1, wherein the post comprises a duration measurement means started by said initializing signal, for secondly measuring a duration between said initializing signal and a received identification signal, and further comprising a comparison means for verifying that the therein secondly measured duration corresponds to said data corresponding to said duration value.

3. A system according to claim 2, wherein the post detects the simultaneous transmission, by two different moving bodies, of a same data corresponding to a first duration value, and further including means to request the two moving bodies, identified by this same data, to transmit a new data corresponding to a new duration value of their intrinsic specific code, at the end of a predetermined period of time, measured from a new initializing signal and related unequivocally to the new duration value.

4. A system according to claim 3, wherein, in response to an initializing signal, each moving body transmits its identification signal followed by a word that is respectively associated with said each moving body and is of a recognizable type, such that the superimposition of two words of said recognizable type gives a word of a different type that can be recognized by the post as being a word that has not come from a transmission by a single moving body.

5. A system according to claim 4, wherein said word transmitted after the identification signal is a random binary sequence having characteristics such that the simultaneous reception by the post of two different random binary sequences transmitted at the same time by two different moving bodies is detectable by the post.

6. A system according to any one of claims 1–5, wherein the post assigns each identified moving body a provisional code for the duration of an exchange of data carried out between the post and the moving body during the period when the moving body is in a radius of action of the post, this provisional code being cancelled at the end of exchange of data.

7. A system according to claim 1, further comprising:

a transponder associated with each moving body which arrives in the vicinity of the post, an intrinsic specific code with at least one character being associated with each transponder, the characters being chosen from an ordered set in which ordered values are assigned to these characters or to groups of characters;

a control device located in the post and communicating by electromagnetic means with the transponders;

wherein said transponder transmits an identification signal only from the reception of an initializing signal transmitted by the post; and said transponder transmits at least a data corresponding to a duration value of its intrinsic specific code at the end of a period of time related unequivocally to said duration value, so that two transponders having a different duration value transmit at different instants.

8. A system according to claim 7, wherein each transponder is interrogated by the post and is recognized on the basis of a beginning portion of the identification signal received by said post, and each transponder includes:

means for receiving a provisional personal code designed to be used during the period of the data exchange;

means for sending out data particularly identified with said each transponder;

means for receiving other data;

means for receiving an end-of-exchange signal from the post.

* * * * *